United States Patent
Gibson

(10) Patent No.: US 9,665,665 B2
(45) Date of Patent: May 30, 2017

(54) VISUALIZATION CREDIBILITY SCORE

(71) Applicant: International Business Machines Corporation, Armonk, NY (US)

(72) Inventor: Stephen D Gibson, Kemptville (CA)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/971,146

(22) Filed: Aug. 20, 2013

(65) Prior Publication Data

US 2015/0055880 A1    Feb. 26, 2015

(51) Int. Cl.
G06T 11/20      (2006.01)
G06F 17/30     (2006.01)
G06K 9/00      (2006.01)

(52) U.S. Cl.
CPC ... G06F 17/30994 (2013.01); G06K 9/00476 (2013.01)

(58) Field of Classification Search
None
See application file for complete search history.

(56) References Cited

U.S. PATENT DOCUMENTS

| | | | |
|---|---|---|---|
| 7,251,777 B1* | 7/2007 | Valtchev | G06F 17/211 707/999.006 |
| 7,581,177 B1* | 8/2009 | Mollicone | G06F 17/227 715/243 |
| 7,822,631 B1* | 10/2010 | Vander Mey | G06F 17/30038 705/7.29 |
| 8,990,124 B2* | 3/2015 | Tsaparas | G06Q 30/02 705/347 |
| 8,990,352 B1 | 3/2015 | Kosslyn et al. | |
| 2003/0016233 A1* | 1/2003 | Charpentier | G06F 3/14 345/619 |
| 2004/0090472 A1* | 5/2004 | Risch | G06F 17/30716 715/853 |
| 2005/0289561 A1 | 12/2005 | Torres et al. | |
| 2006/0089200 A1 | 4/2006 | Twerdahl | |
| 2006/0253843 A1* | 11/2006 | Foreman | H04L 67/02 717/136 |
| 2006/0288275 A1* | 12/2006 | Chidlovskii | G06F 17/30923 715/236 |
| 2006/0288278 A1* | 12/2006 | Kobayashi | G06F 17/212 715/209 |
| 2007/0011042 A1 | 1/2007 | Kim | |

(Continued)

OTHER PUBLICATIONS

Fout, "Reliable Visualization: Verification of Visualization based on Uncertainty Analysis", Submitted to IEEE Visualization Conference, Mar. 31, 2011 (10 pps.).

(Continued)

*Primary Examiner* — Anh-Tuan V Nguyen
(74) *Attorney, Agent, or Firm* — Maeve Carpenter

(57) ABSTRACT

One embodiment of the present invention discloses a method, computer program product, and system for a method of determining the credibility of a visualization. Visualization data is received from an electronic device. The visualization data is compared to a plurality of visualization credibility criteria to determine a level of credibility for each of the visualization credibility criteria. The credibility of the visualization is rated based on the level of credibility for each of the visualization credibility criteria.

8 Claims, 4 Drawing Sheets

(56) References Cited

U.S. PATENT DOCUMENTS

| | | | |
|---|---|---|---|
| 2007/0027992 A1* | 2/2007 | Judge | G06Q 10/107 709/227 |
| 2007/0076950 A1* | 4/2007 | Shah | G06K 9/00456 382/170 |
| 2007/0104374 A1* | 5/2007 | Terakawa | G06K 9/00248 382/190 |
| 2008/0109244 A1 | 5/2008 | Gupta | |
| 2008/0184366 A1 | 7/2008 | Alperovitch et al. | |
| 2008/0201373 A1 | 8/2008 | Ahn et al. | |
| 2009/0070130 A1* | 3/2009 | Sundaresan | G06Q 50/01 705/319 |
| 2009/0144605 A1* | 6/2009 | Radakovic | G06K 9/00469 715/200 |
| 2009/0276233 A1* | 11/2009 | Brimhall | G06Q 40/025 705/38 |
| 2009/0319342 A1* | 12/2009 | Shilman | G06F 17/30864 705/7.41 |
| 2010/0049590 A1 | 2/2010 | Anshul | |
| 2010/0088152 A1 | 4/2010 | Bennett | |
| 2010/0095196 A1* | 4/2010 | Grabarnik | G06F 17/241 715/230 |
| 2010/0125586 A1 | 5/2010 | Van Vleck et al. | |
| 2010/0150448 A1* | 6/2010 | Lecerf | G06F 17/3061 382/190 |
| 2010/0153354 A1 | 6/2010 | Buccella et al. | |
| 2010/0262610 A1* | 10/2010 | Acosta | G06Q 10/00 707/748 |
| 2011/0069893 A1* | 3/2011 | Metayer | G06K 9/00442 382/218 |
| 2011/0119072 A1* | 5/2011 | Lipner | G06Q 10/10 705/2 |
| 2011/0167016 A1 | 7/2011 | Shaban et al. | |
| 2012/0084637 A1* | 4/2012 | Mizutani | G06F 17/30268 715/234 |
| 2012/0131185 A1 | 5/2012 | Petersen et al. | |
| 2012/0246093 A1* | 9/2012 | Stibel | G06Q 30/00 705/347 |
| 2012/0310937 A1* | 12/2012 | Stibel | G06F 17/30864 707/737 |
| 2013/0055227 A1* | 2/2013 | Zachariah | G06F 8/51 717/168 |
| 2013/0113802 A1 | 5/2013 | Weersink et al. | |
| 2014/0164529 A1* | 6/2014 | Kleppmann | H04L 29/08072 709/206 |
| 2014/0195891 A1* | 7/2014 | Venkata Radha Krishna Rao | G06F 17/218 715/234 |
| 2015/0058359 A1 | 2/2015 | Gibson | |

OTHER PUBLICATIONS

Kondapaeni, et al., "Visualization Techniques Utilizing the Sensitivity Analysis of Models", Proceedings of the 2007 Winter Simulation Conference, Dec. 9-12, 2007 (8 pps.).

U.S. Appl. No. 14/319,673, filed Jun. 30, 2014; Entitled "Visualization Credibility Score".

"Appendix P: List of IBM Patents or Patent Applications Treated As Related", filed herewith, pp. 1-2.

* cited by examiner

VISUALIZATION CREDIBILITY SCORE

FIELD OF THE INVENTION

The present invention relates generally to the field of visualization and more particularly to credibility of visualizations.

BACKGROUND OF THE INVENTION

Visualizations exist on almost any subject. A visualization is any technique for creating images, diagrams or animations to communicate a message. Many fields of visualizations exist including information visualizations, geological visualizations (geovisualizations), interactive visualizations, scientific visualizations and software visualizations to name a few. Data visualization is the study of the visual representation of data. An example of a data visualization can be a line graph showing a multitude of connections on social media. Geovisualization can be a topographic map. A common information visualization we see daily is a weather map. Weather maps are generated from atmospheric data and radar, and show current conditions and predictions of future weather conditions. As the field of visualization continues to grow, one example of an outgrowth of the field of visualization is visual analytics. Visual analytics is the science of analytical reasoning facilitated by visual interactive interfaces that can attack some problems whose size, complexity and need for closely coupled human and machine analysis make it difficult to solve. Visualizations continue to become a common part of our daily activities. The field of visualization continues to expand, providing new ways of communicating, understanding data and increasingly complex systems.

SUMMARY

Embodiments of the present invention disclose a method, computer program product, and system for a method of determining the credibility of a visualization. The visualization data is compared to one or more of a plurality of visualization credibility criteria to determine a level of credibility for each of the one or more of the plurality of visualization credibility criteria. The credibility of the visualization is rated based on the level of credibility for each of the one or more of the plurality of visualization credibility criteria.

Aspects of the present invention disclose, a computer program product for determining the credibility of a visualization. The computer program product comprising one or more computer-readable storage media and program instructions stored on the one or more computer-readable storage media. The program instructions to receive visualization data from an electronic device utilized to compare the visualization data to one or more of a plurality of visualization credibility criteria to determine a level of credibility for each of the one or more of the plurality of visualization credibility criteria. The program instructions to rate the credibility of the visualization based on the level of credibility for each of the one or more of the plurality of visualization credibility criteria.

In another aspect of the present invention, a computer system is utilized for determining the credibility of a visualization. The computer system comprising one or more computer processors and/or one or more computer-readable storage media wherein the program instructions are stored on the computer-readable storage media for execution by at least one of the one or more processors. The program instructions include comparing the visualization data to one or more of a plurality of visualization credibility criteria to determine a level of credibility for each of the one or more of the plurality of visualization credibility criteria. The program instructions are included to rate the credibility of the visualization based on the level of credibility for each of the one or more of the plurality of visualization credibility criteria.

DETAILED DESCRIPTION

Figure 1:
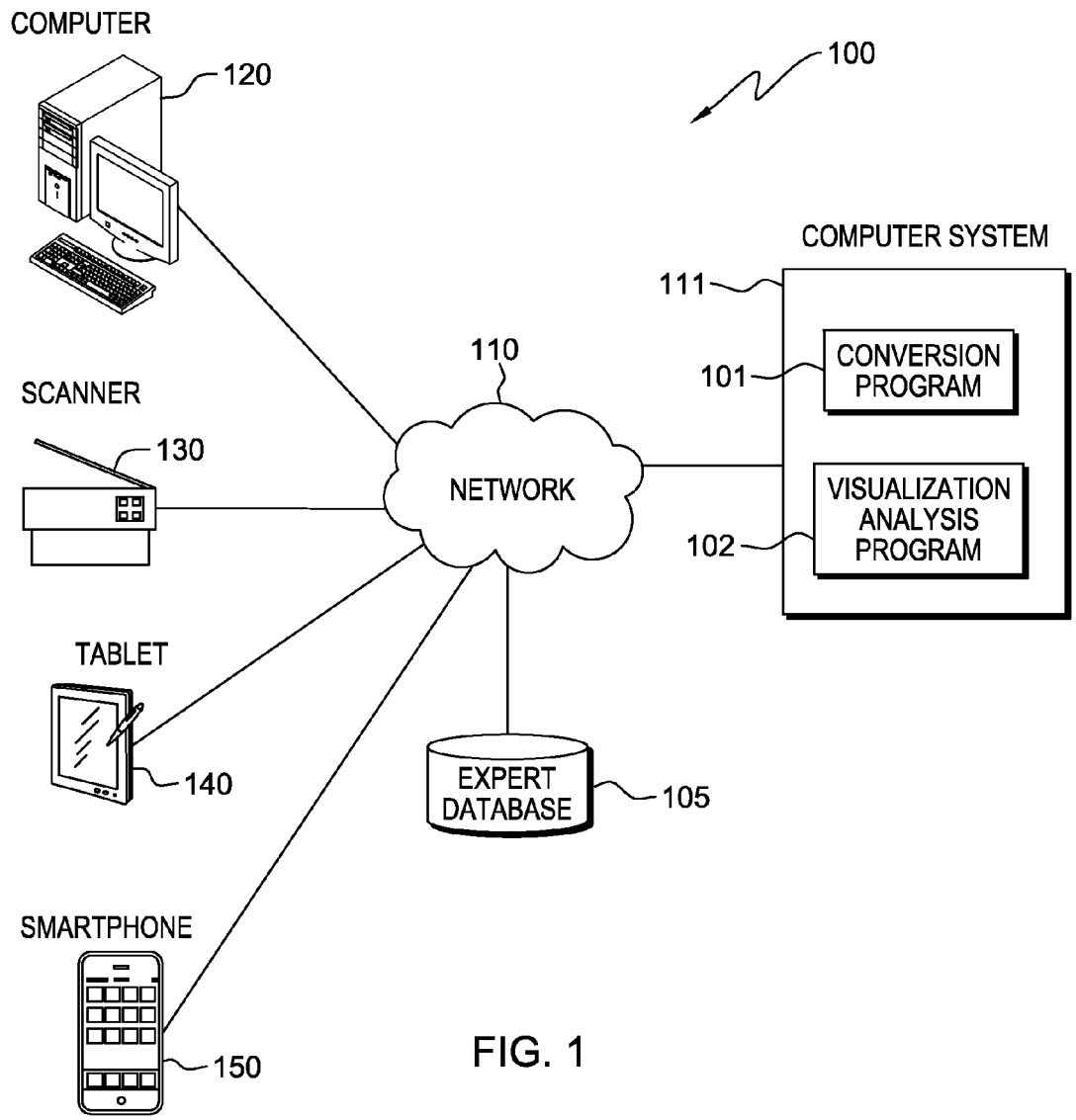
FIG. 1 is a functional block diagram illustrating a distributed data processing environment, in accordance with an embodiment of the present invention.

One skilled in the art of visualizations will recognize the encompassing field of visualization and the growing focus on visualizations to represent complex systems and data. Some visualizations we see today can be as simple as a map or as complex as a visualization in the field of computer graphics, modeling how a car deforms in an off-set crash test. A visualization, in information visualization, uses computer supported tools to explore large amounts of data, much of it abstract, by selecting data and transforming it to develop a form that facilitates exploration and understanding. Examples of information visualizations are: a map of early Internet use where each line represents two internet protocol (IP) addresses, or a treemap of Portugal's exports, where a treemap displays hierarchical data as a set of nested rectangles. Each branch of a tree is a rectangle, tiled with smaller tiles representing sub-branches. The rectangle's area is proportional to a specified dimension of the mapped data. Additional dimensions and data can be shown in treemaps through the use of color. When size and color dimensions correlate in a significant way within the tree structure, patterns can emerge that would normally be difficult to spot. In such cases, selection of dimensions and color can be important to successful evaluations in treemapping information visualizations.

Embodiments of the present invention recognize that not all of these visualizations are as effective or as accurate as others. Embodiments of the present invention provide a computer driven method to determine the credibility of visualizations and a credibility rating of the visualization for client consumption. Credibility is defined as the quality of being believable. Traditionally, credibility relies on two main components, expertise and trustworthiness. Using credibility criteria provided by recognized experts in the field of visualization to evaluate the credibility of a visualization, the methodology presented in embodiments of the present invention addresses both of these primary elements of credibility.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention. Distributed data processing environment 100 includes computer system 111, expert database 105, and client devices 120, 130, 140 and 150 all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between computer system 111 and client devices 120, 130, 140, 150 and expert database 105.

Computer system 111 may be a laptop computer, tablet computer, netbook computer, personal computer (PC), a desktop computer, a personal digital assistant (PDA), a smart phone, or any programmable electronic device capable of communicating with expert database 105, client devices 120, 130, 140 and 150 via network 110 and with various components and devices within distributed data processing environment 100. In certain embodiments, computer system 111 represents a computer system utilizing clustered computers and components that act as a single pool of seamless resources when accessed through network 110, as is common in data centers and with cloud computing applications. Computer system 111 may include internal and external hardware components, as depicted and described in further detail with respect to FIG. 4. Computer system 111 includes visualization analysis program 102 and conversion program 101. Computer system 111 may be a server computer system accessible to a plurality of users of visualization analysis program 102.

Client devices 120, 130, 140, and 150 can each respectively be a computer, a laptop computer, a personal digital assistant (PDA), tablet, scanner, smartphone or any electronic device capable of communicating with computer system 111 in various embodiments of the present invention.

Visualization analysis program 102 resides on computer system 111. Visualization analysis program 102 receives visualization data from client devices 120, 130, 140 and 150 via network 110. Visualization analysis program 102 can compare visualization data to data from expert database 105. Visualization analysis program 102 determines a level of visualization credibility utilizing credibility criteria provided by expert database 105. Visualization analysis program 102 can determine a visualization credibility rating based on the credibility criteria evaluation results. Visualization analysis program 102 sends the visualization credibility rating back to the originating client device or another identified device over network 110.

Conversion program 101, which resides on computer system 111, may receive visualization data not in a machine readable format from visualization analysis program 102. Some data, such as published graphs, strip charts, heat plots, photographs of data, hardcopy graphs, models, or other visualizations, for example, can be scanned and sent to visualization analysis program 102. Visualization analysis program 102 sends the non-machine readable data to conversion program 101. Conversion program 101 can convert the visualization data to a machine readable format using various techniques. For example, optical plotter, plot digitizer or rasterization can digitize visualization data.

Once conversion program 101 has digitized or converted the visualization data into a machine readable format, conversion program 101 sends the machine readable visualization data back to visualization analysis program 102.

Expert database 105 stores visualization credibility criteria, input by one or more experts in the field of visualization. Expert database 105 can receive queries from visualization analysis program 102 to provide visualization credibility criteria for visualization evaluation. A query can request visualization credibility criteria pertaining to one or more fields, types or other groupings of visualization credibility criteria stored in expert database 105. Expert database 105 can be one or more storage devices. In one embodiment, expert database 105 can be included as a subprogram or routine within computer system 111.

Figure 2:
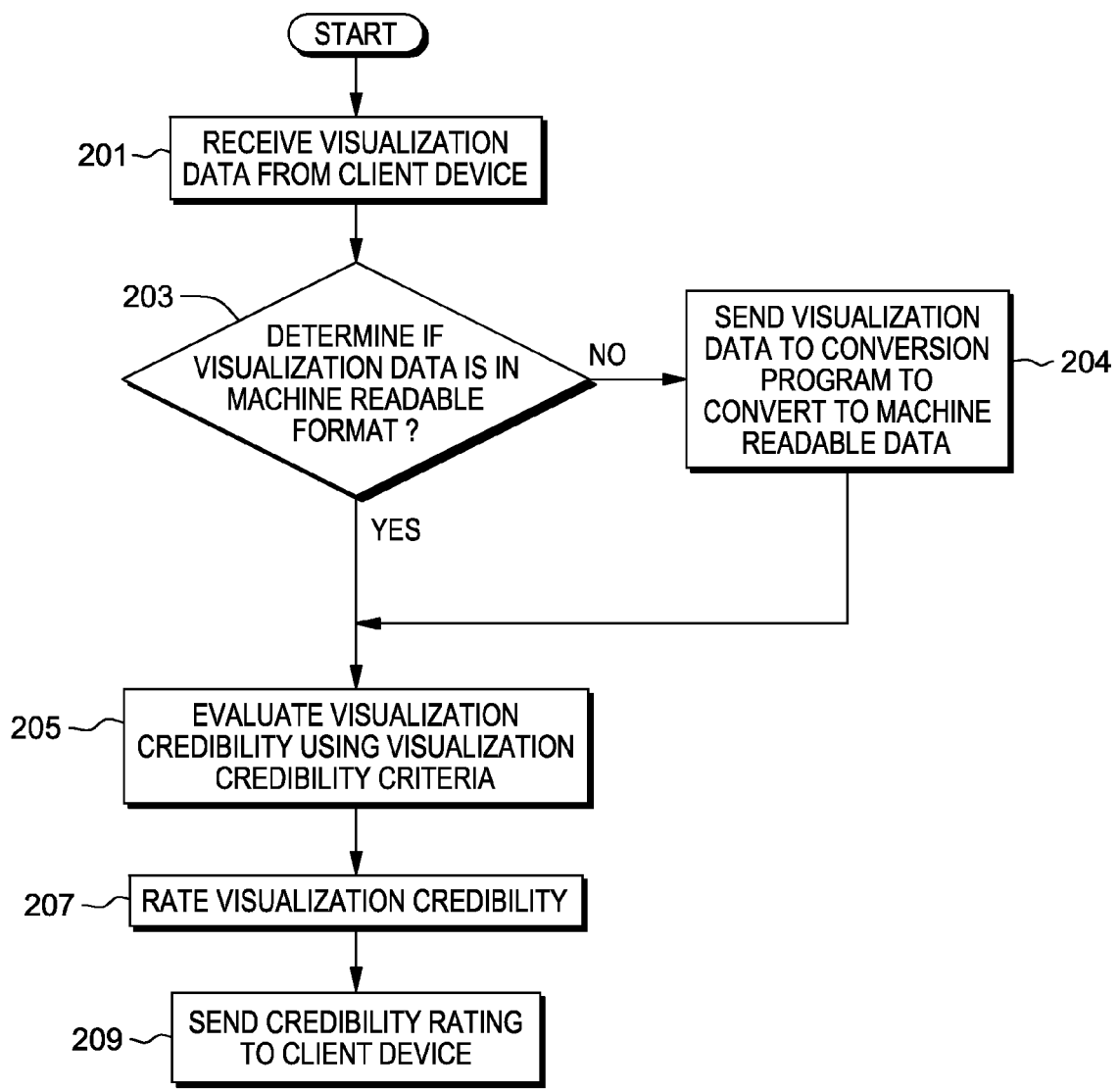
FIG. 2 is a flowchart depicting operational steps of a visualization analysis program, on a computer system within the data processing environment of FIG. 1, in accordance with an embodiment of the present invention.

FIG. 2 is a flowchart depicting operational steps of a visualization analysis program 102, according to an embodiment of the present invention.

In step 201, visualization analysis program 102 receives visualization data from one of the client devices 120, 130, 140 or 150. In one embodiment of the invention, visualization data includes a field for a user to identify the type of visualization provided. For example, the client device may send an information visualization and identify it as a hyperbolic tree according to user input. In another example, the client device may send a surface flow visualization identified as a flow streamline or a surface flow visualization. In another embodiment, the client device can send the user identification of the visualization type with the visualization data. Visualization analysis program 102 receives the field or type of visualization to use in the evaluation of visualization credibility.

In step 203, visualization program 102 determines if the visualization data is in a machine readable format. In an embodiment of the present invention, client devices may send scanned or other non-machine readable data to visualization analysis program 102. If determining the visualization data received from client devices is in machine readable format, the visualization analysis program proceeds to step 205. When visualization analysis program 102 receives data not in an appropriate format for processing by visualization analysis program 102, e.g., not in a machine readable format, visualization analysis program 102 proceeds to step 204 and sends the visualization data to conversion program 101 on computer system 111.

In step 204, visualization analysis program 102 sends visualization data to conversion program 101. Conversion program 101 can use an optical plot reader, plot digitizer, rasterization, or scanline rendering, for example, to first convert a physical image into a digital image. Further analysis is done via feature matching, neural networks or other similar techniques to turn the digital image into a machine readable format that includes both the data in the visualization as well as the structure and adornments of the visualization. This machine readable format can be XML, JSON or a purely binary format. Conversion program 101 can also use a number of applications such as shape recognition programs for data image conversion. Visualization analysis program 102 receives machine readable data from conversion program 101 when the visualization data conversion run by conversion program 101 has completed. In another embodiment, the functionality of conversion program 101 may be integrated into visualization analysis program 102.

In step 205, visualization analysis program 102 evaluates visualization credibility utilizing visualization credibility criteria. Visualization analysis program 102 queries expert database 105 for visualization credibility criteria. Expert database 105 contains criteria used to evaluate the credibility of a visualization. One or more experts specializing in the subject of visualizations supply or enter directly into expert database 105 the criteria for credibility evaluation. These experts may have expertise in visualizations and may, more specifically, have expertise in a specific field of visualization. For example, one or more experts specializing in geovisualization can provide the credibility criteria for evaluation of a geovisualization. In an embodiment of the present invention, a user may input credibility criteria. Expert database 105 may utilize crowdsourcing when receiving user input for visualization credibility criteria. In another embodiment, an intelligent system, (for example, IBM's Watson) can input machine-determined visualization credibility criteria in expert database 105. In one embodiment of the present invention, visualization analysis program 102 compiles the results of the evaluation of a visualization comparing the visualization data against each of the credibility criteria provided by expert database 105. In an exemplary embodiment of the invention, one or more experts, in a field or type of visualization, provide to expert database 105 a set of credibility criteria for each field and/or type of visualization. For example, fields of visualization can include geovisualization, information visualization, graphical visualization, scientific visualization, and data visualization. Type of techniques or methods of visualization provide sub-divisions of the fields of visualization. For ease of discussion, types of techniques or methods of visualization can be called types of visualizations for the purposes of embodiments of the present invention. Examples of types of visualization for information visualization include hyperbolic tree, histograms, cladograms, treemapping, and scatter plots. Expert database 105 arranges credibility criteria or a set of credibility criteria for a field or type of visualization. Visualization analysis program 102 can query expert database 105 for the credibility criteria pertaining to a field or type of visualization. When a user identifies visualization type, visualization analysis program 102 evaluates the visualization against the set of credibility criteria for the identified type of visualization. For example, client device 120 provides visualization data, as input by the user, identifying the visualization as a data visualization, in particular, a mindmap. Visualization analysis program 102 can compare the visualization data provided to credibility criteria for a mindmap visualization. The visualization credibility criteria evaluation results can be in the form, for example, credible, not credible or not applicable for each credibility criteria evaluated for a visualization.

Figure 3:
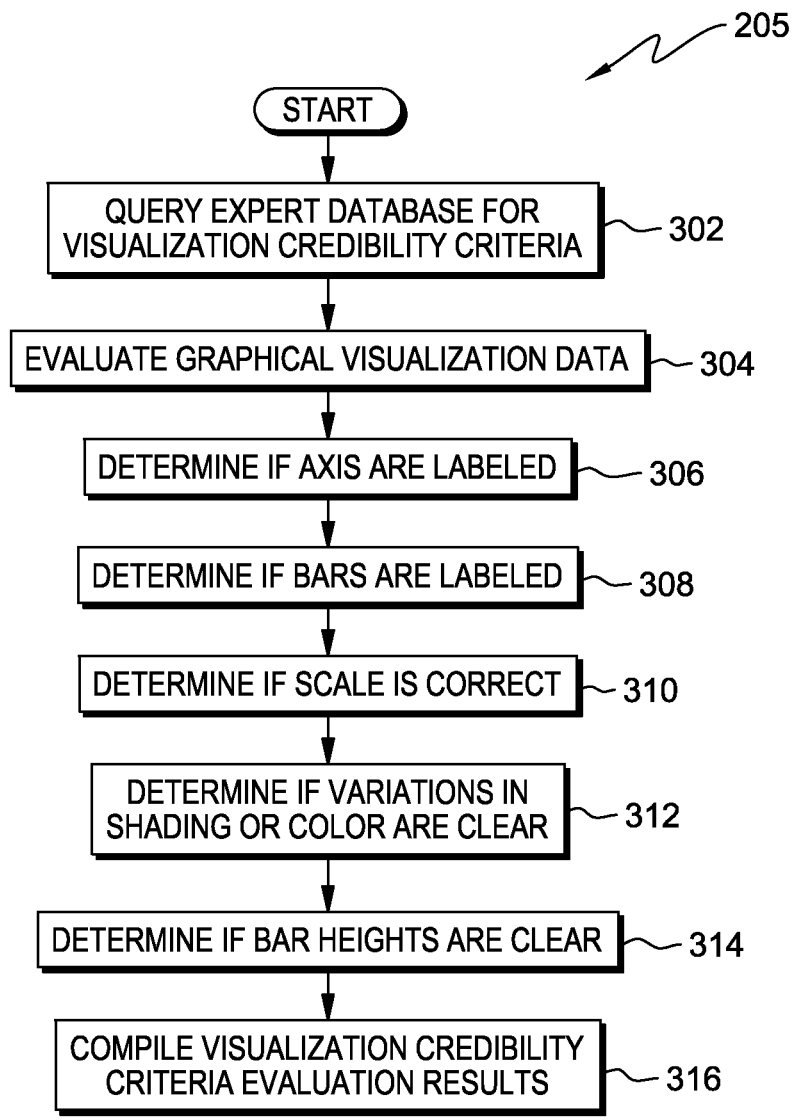
FIG. 3 illustrates operational steps of an analysis of a graphical visualization performed by visualization analysis program in accordance with an embodiment of the present invention.

In another embodiment of the present invention, visualization analysis program 102 uses a decision tree or similar process to determine the field or type of visualization. For example, visualization analysis program 102, structured as follows, can illustrate a method to identify an information visualization. A client device may provide visualization data of a treemap, a type of information visualization, to visualization analysis program 102. Visualization analysis program 102 can evaluate a series of attributes of the visualization. In an embodiment, visualization analysis program 102 can compare the form of the received visualization including shapes, lines, and text to known forms of visualizations, for example, treemaps, dashboards, data flow diagrams or line graphs. Visualization analysis program 102 can use a series of "yes" or "no" type queries to determine a field or type of visualization. An example of a series of questions to analyze a visualization to determine the type of visualization, may be as follows: is it a two-dimensional visualization, if yes, is it a line graph, if no, is it a circle or circles, if no, is it a rectangle or series of rectangles, if yes, is it nested rectangles, if yes, apply credibility criteria for a treemap. Visualization analysis program 102 queries expert database 105 to provide a set of credibility criteria for the field of information visualizations and specifically, a set of credibility criteria developed to evaluate treemaps. In some cases, evaluation of credibility criteria from one or more field or type of visualization credibility can occur. Field of visualization today are closely related and may be overlapping fields e.g. a dot map of cholera outbreak in 1800's can be both a scientific visualization and an information visualization. FIG. 3, discussed later, is a specific example of a possible method for evaluating a graphical visualization. The discussion of FIG. 3 includes some examples of specific credibility criteria that may be applied.

In step 207, visualization analysis program 102 rates the visualization credibility. Visualization analysis program 102 provides credibility evaluation results, for a visualization, compiled in the form: x credible, y non-credible, and z non-applicable where x, y, and z are determined by the comparison of a visualization to each of the credibility criteria supplied by expert data base 105. For example, x credible results provide the summation or a count of all credible results for each of the individual credibility criteria compared to the visualization in the credibility evaluation. In some cases, visualization evaluations can provide insufficient credible results for a credibility rating of a visualization. In some cases, the credibility evaluation may only result in one credible result, one skilled in the art will recognize that a preferred evaluation may result in several credible results. For example, when a number of credible criteria can be evaluated by visualization program 102, more than one credible evaluation may be preferred.

In one embodiment of the present invention, visualization analysis program 102 creates a rating of percent credible using the ratio of the number of credible results divided by the number of the credible and the number the non-credible results. The resulting ratio of x credible evaluations to the sum of x credible evaluations and y not credible evaluations or x/(x+y) can be shown as a percent credible by multiplying by one hundred, for example: 16 credible evaluations and 4 not credible evaluations would be 80% credible (16/20*100). Visualization analysis program 102 returns the credibility rating for a visualization to the originating client device, for example, in the form 80% credible and includes the field and/or type of visualization used for the visualization credibility criteria analysis.

In another embodiment of the invention, visualization analysis program 102 can convert the results into a natural language format. In one example, visualization analysis program 102 can convert visualization criteria evaluations into an easily understandable credibility rating using a natural language and the following conversions:

| Percent credible | Credibility Rating |
|---|---|
| >90% | Credible |
| 80-90% | Marginally Credible |
| <75% | Not Credible |

The credibility rating and percent credible shown above are used as examples in this table. Other percentages, measures (ratios, numbers for example), or a different credibility rating or words chosen for credibility rating in natural language may be used.

In step 209, visualization analysis program 102 sends the visualization credibility rating to the originating client device or other specified client device. Visualization analysis program 102, for example, can send the visualization credibility rating as the compiled results of the visualization credibility criteria evaluation (x credible, y not credible and z not applicable), as a percent credible, or as a natural language rating (credible, marginally credible, or not credible). In an exemplary embodiment of the present invention, the user may select, on the client device, the desired format for the visualization credibility rating (compiled data, percent credible or natural language) before the client device sends the visualization data to visualization analysis program 102. Visualization analysis program 102 can send visualization credibility rating, as specified, to the user. Visualization analysis program 102 can also include one or more fields or types of visualizations used to evaluate the visualization when returning the visualization credibility rating.

FIG. 3 illustrates operational steps of an analysis of a graphical visualization in accordance with an embodiment of the present invention. FIG. 3 is detailed description of an example of a credibility evaluation of a graphical visualization as occurring in step 205 of FIG. 2.

In step 302, visualization analysis program 102 can query expert database 105 to provide the visualization credibility criteria pertaining to the type of visualization if provided by the client device. For example, if the user identifies the field or type of visualization as a bar graph, client device 150 can identify the visualization as a bar graph to visualization analysis program 102. Visualization analysis program 102 can query expert database 105 to provide the credibility criteria for a bar graph.

If the client device does not provide an identified field or type for a visualization, visualization analysis program 102 can use a decision tree or similar method to determine the type of visualization as discussed in step 207 of FIG. 2. A decision tree for a graphical visualization may follow a series of steps to determine the field or type of visualization. For example, visualization analysis program 102 can use shape recognition programs, and comparisons of known shapes and forms to visualization data to identify the type of graphical visualization. As in step 207, visualization analysis program may follow a series of yes/no queries to identify the type of visualization, for example: is the visualization a two dimensional representation, if yes, is it using an x-y axis, if yes, is it individual points, if no, is it one or more lines, if yes, do the lines form rectangles extending from one axis, if so, evaluate bar graph credibility criteria. Visualization analysis program can query expert database 105 for the visualization credibility criteria for a bar graph.

In step 304, an evaluation of the graphical visualization data proceeds utilizing the credibility criteria for bar graphs as provided by experts in the field of graphical visualizations. Examples of some of the credibility criteria evaluated may include Are the axes labeled?
Are the bars labeled?
Is the scale correct?
Are variations in shading or colors clear?
Is the bar height clear?

Examples of situations where visualization analysis program 102 may identify a graphical visualization criteria as not credible, may include; graphs that do not have axes or bars labeled, graphs that may not use an appropriate scale, or may be difficult to read due to similar colors or shading.

In steps 306 and 308, visualization analysis program 102 can confirm if axes are labeled and if each bar is labeled or identified. When the presence of labels or identification is confirmed for axis and bars, visualization analysis program 102 can evaluate a bar graph as credible for axis labeling and bar labeling.

In step 310, visualization analysis program 102 determines if the scale used in the bar is correct. An example of a not credible graph can include a graph that uses a linear x-y scale for data with a large variation in values ranging from 50 to 10,000. Visualization analysis program 102 can evaluate a graph of data with a large range of values from 50 to 10,000 as credible if shown on a logarithmic scale. In another example, visualization analysis program 102 can evaluate a bar graph visualization with a gap in the scale used as not credible. In some cases, a graph may start at zero and jump to large number such as one hundred then, use small increments on the scale or axis. In other words, a graph jumps to one hundred in one increment and then, proceeds by ten for similar increments (artificially, exaggerates small differences in data). Conversely, a graph using an axis or scale with a range of zero to ten thousand would be considered not credible when data ranges from two hundred to three hundred (obscures variations in data).

In step 312, visualization analysis program 102 determines if the variations in shading or color are clear. In evaluating variations in color or shading for visual clarity, a number of scales exist for evaluating color (spectral primary system RGB, for example), hue, saturation and lightness. Programs using these values, for example, can evaluate color. Visualization analysis program 102 may evaluate a bar graph using shades of grey as not credible if the variation in bar shading is not sufficient to be clear to the average user (e.g. the intensity of the color, black, or lightness variation is not sufficient). Visualization analysis program 102 can evaluate a bar graph using black and white bars as credible or a bar graph using yellow, red, and blue as credible, for example.

In step 314, visualization analysis program 102 can determine if bar heights are clear. In some examples, a bar graph may use three dimensional bars that are difficult to read. Reading the bar height is visually confusing due to multiple horizontal lines (bar height and height of the three dimensional element). Visualization analysis program 102 may find two dimensional bars in graphs as credible while three dimensional bars may not be credible for clarity of bar height.

In step 316, visualization analysis program 102 compiles the results of the credibility criteria evaluation.

Figure 4:
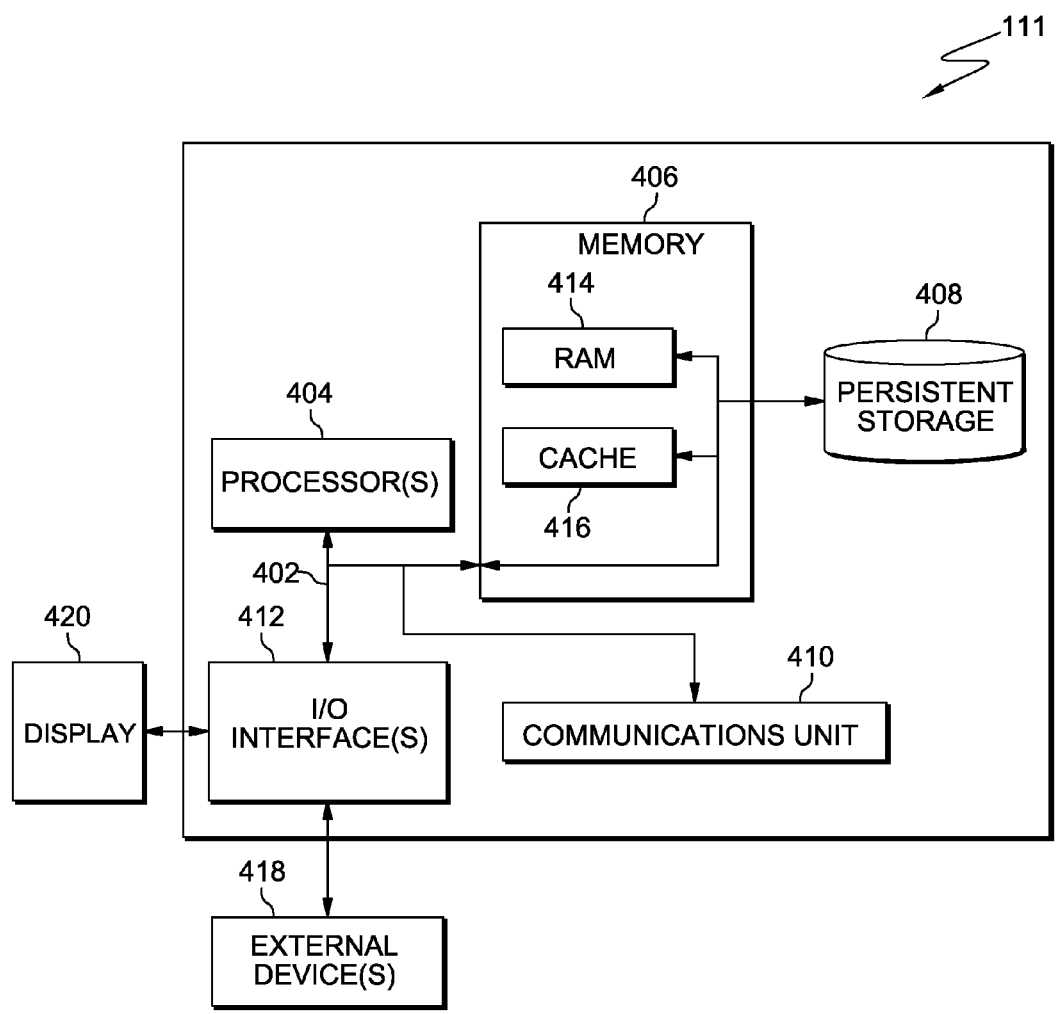
FIG. 4 depicts a block diagram of components of the computer system executing the visualization analysis program, in accordance with an embodiment of the present invention.

FIG. 4 depicts a block diagram of components of computer system 111 for implementing embodiments of the present invention.

Computer system 111 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Visual analysis program 102 and conversion program 101 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of expert database 105, and client devices 120, 130, 140 and 150. In these examples, communications unit 410 includes one or more network interface cards. Communications unit 410 may provide communications through the use of either or both physical and wireless communications links. Visualization analysis program 102 and conversion program 101 may be downloaded to persistent storage 408 through communications unit 410.

I/O interface(s) 412 allows for input and output of data with other devices that may be connected to computer system 111. For example, I/O interface 412 may provide a connection to external device(s) 418 such as a keyboard, keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., visualization analysis program 102, conversion program 101, and expert database 105 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for determining a credibility of a visualization, the computer program product comprising:
one or more computer-readable storage devices and program instructions stored on the one or more computer-readable storage devices, wherein the one or more computer-readable storage devices are hardware, the program instructions comprising:
program instructions to receive visualization data for a visualization;
program instructions to determine a type of visualization of the received visualization data, wherein the type of visualization is a technique to communicate a message using images, diagrams, or animations;
program instructions to determine whether the visualization data is in a machine-readable format;
responsive to determining the visualization is not in a machine-readable format, program instructions to convert the visualization data to a machine-readable format appropriate for processing, including both the visualization data and a structure of the visualization, wherein the program instructions to convert include use of at least one application of feature matching, shape recognition and a neural network;
responsive to determining the visualization data is in a machine-readable format, program instructions to compare the visualization data to one or more of a plurality of visualization credibility criteria for the type of visualization to determine one or more credibility evaluation results for each of the one or more of the plurality of visualization credibility criteria, wherein the plurality of visualization credibility criteria is based on information provided by one or more experts specializing in visualizations; and
program instructions to determine a credibility rating of the visualization based on the one or more credibility evaluation results for each of the one or more of the plurality of visualization credibility criteria.

2. The computer program product of claim 1, wherein program instructions to determine one or more credibility evaluation results for each of the one or more of the plurality of visualization credibility criteria include determining at least one result as one of: credible, not credible, or not applicable.

3. The computer program product of claim 1, wherein program instructions to determine the type of visualization further comprise at least one of: program instructions to receive input identifying the type of visualization from a user, and program instructions to compare a form of the received visualization data to one or more known visualization forms in order to identify the type of visualization such that the plurality of visualization credibility criteria corresponding to the type of visualization can be used.

4. The computer program product of claim 1, further comprising, program instructions to determine a format of the credibility rating of the visualization.

5. A computer system for determining the credibility of a visualization, the computer system comprising:
one or more computer processors;
one or more computer-readable storage media;
program instructions stored on the computer-readable storage media for execution by at least one of the one or more processors, the program instructions comprising:
program instructions to receive visualization data for a visualization;
program instructions to determine a type of visualization of the received visualization data, wherein the type of visualization is a technique to communicate a message using images, diagrams, or animations;
program instructions to determine whether the visualization data is in a machine-readable format;
responsive to determining the visualization data is not in a a machine-readable format, program instructions to convert the visualization data to a machine-readable format appropriate for processing, including both visualization data and a structure of the visualization, wherein the program instructions to convert include use of at least one application of feature matching, shape recognition, and a neural network;
responsive to determining the visualization data is in a machine-readable format, program instructions to compare the visualization data to one or more of a plurality of visualization credibility criteria for the type of visualization to determine one or more credibility evaluation results for each of the one or more of the plurality of visualization credibility criteria, wherein the plurality of visualization credibility criteria is based on information provided by one or more experts specializing in visualizations; and
program instructions to determine a credibility rating of the visualization based on the one or more credibility evaluation results for each of the one or more of the plurality of visualization credibility criteria.

6. The computer system of claim 5, wherein program instructions to determine one or more credibility evaluation results for each of the one or more of the plurality of visualization credibility criteria include determining at least one result as one of: credible, not credible, or not applicable.

7. The computer system of claim 5, wherein program instructions to determine the type of visualization further comprise at least one of: program instructions to receive input identifying the type of visualization from a user, and program instructions to compare a form of the received visualization data to one or more known visualization forms in order to identify the type of visualization such that the plurality of visualization credibility criteria corresponding to the type of visualization can be used.

8. The computer system of claim 5, furthering comprising, program instructions to determine a format of the credibility rating of the visualization.

\* \* \* \* \*